United States Patent
Kim et al.

(10) Patent No.: US 8,799,619 B2
(45) Date of Patent: Aug. 5, 2014

(54) METHOD AND SYSTEM FOR PROVIDING DISTRIBUTED PROGRAMMING ENVIRONMENT USING DISTRIBUTED SPACES, AND COMPUTER READABLE RECORDING MEDIUM

(75) Inventors: Woo Hyun Kim, Yongin-si (KR); Du-Ho Kim, Yongin-si (KR); Tae Il Yun, Yongin-si (KR)

(73) Assignee: NHN Corporation, Seongnam-si (KR)

( * ) Notice: Subject to any disclaimer, the term of this patent is extended or adjusted under 35 U.S.C. 154(b) by 300 days.

(21) Appl. No.: 13/201,098

(22) PCT Filed: Apr. 17, 2009

(86) PCT No.: PCT/KR2009/002014
§ 371 (c)(1),
(2), (4) Date: Sep. 12, 2011

(87) PCT Pub. No.: WO2010/093084
PCT Pub. Date: Aug. 19, 2010

(65) Prior Publication Data
US 2012/0030446 A1    Feb. 2, 2012

(30) Foreign Application Priority Data
Feb. 11, 2009 (KR) .................. 10-2009-0011103

(51) Int. Cl.
*G06F 12/10* (2006.01)
(52) U.S. Cl.
CPC .......... *G06F 12/109* (2013.01); *G06F 12/1027* (2013.01)
USPC .......................................... 711/203; 711/216
(58) Field of Classification Search
CPC ........................... G06F 12/109; G06F 12/1027
USPC ........................................... 711/203, 216
IPC ............. G06F 12/08, 12/0223, 3/067, 2212/263, G06F 2212/1041, 2212/1044
See application file for complete search history.

(56) References Cited

U.S. PATENT DOCUMENTS 6,003,123 A * 12/1999 Carter et al. .................. 711/207
2008/0086620 A1 * 4/2008 Morris .......................... 711/203

(Continued)

FOREIGN PATENT DOCUMENTS

| JP | 2004-252663 | 9/2004 |
| JP | 2006-65525 | 3/2006 |
| KR | 10-0349658 | 8/2002 |
| KR | 10-2007-0083489 | 8/2007 |

OTHER PUBLICATIONS

International Search Report for PCT/KR2009/002014 issued on Feb. 23, 2010.

*Primary Examiner* — Than Nguyen
(74) *Attorney, Agent, or Firm* — Greer Burns & Crain Ltd.

(57) ABSTRACT

Disclosed herein are a method, a system, and a computer-readable recording medium for providing distributed programming environment by using a distributed space.
According to an aspect of the present invention, there is provided a method for processing data in distributed environment, the method including: generating a virtual space using resources provided by a plurality of nodes; and reading or writing data from or in the virtual space by a first application, wherein the data are mapped to a specific location region on the virtual space determined according to attributes of the data and the first application performs a reading operation or a writing operation for the data in the location region.

18 Claims, 5 Drawing Sheets

(56) References Cited

U.S. PATENT DOCUMENTS

| | | | |
|---|---|---|---|
| 2009/0199198 A1* | 8/2009 | Horii et al. | 718/104 |
| 2010/0115228 A1* | 5/2010 | Parker et al. | 711/203 |
| 2011/0276776 A1* | 11/2011 | Ylonen | 711/171 |
| 2012/0159115 A1* | 6/2012 | Cha et al. | 711/203 |

* cited by examiner

METHOD AND SYSTEM FOR PROVIDING DISTRIBUTED PROGRAMMING ENVIRONMENT USING DISTRIBUTED SPACES, AND COMPUTER READABLE RECORDING MEDIUM

CROSS-REFERENCE TO RELATED APPLICATIONS

This application is the National Stage Entry of International Application: PCT/KR2009/002014,filed on Apr. 17, 2009,and claims priority from and the benefit of Korean Patent Application No. 10-2009-0011103,filed on Feb. 11, 2009,both of which are incorporated herein by reference for all purposes as if fully set forth herein.

BACKGROUND OF THE INVENTION

1. Field of the Invention

The present invention relates to a method, a system, and a non-transitory computer-readable recording medium for providing a distributed programming environment by using a distributed space.

2. Discussion of the Background

Large-capacity data are easily transmitted between remote computers with the development of network communication technology. Therefore, a distributed programming (or computing) technology to process a single operation, through the cooperation of a plurality of 20 computers, has been gradually spreading.

An example of the above-mentioned distributed programming environment is a space-based architecture (SBA). The SBA is a software structure for achieving linear scalability of high performance applications using a tuple space, which starts from a concept of a tuple space based on the theoretical Linda language proposed by David Gelernter at Yale University. According to the SBA, since all the distributed processes perform mutual communications and resource sharing based on a space, they do not know detailed information about each other and can perform various types of distributed programming using a simple interface and without time and space restrictions.

A non-centralized distributed system referred to as a distributed hash table (DHT) has recently received attention. The DHT has characteristics providing lookup services similar to a Hash table. The DHT can provide a fast lookup service, while securing scalability and robustness of a network, by an equalized distribution of resources and a structured topology. Therefore, DHTs have been used in various applications such as P2P services.

SUMMARY OF THE INVENTION

Despite the technical merits of the DHT, it is not easy to find a case in which the DHT technology is used for large-scale calculation in the distributed environment. Therefore, a need exists for a new distributed programming environment including the benefits of both the SBA and DHT.

An object of the present invention is to solve the above-mentioned problems.

Further, another object of the present invention is to secure linear scalability of a distributed programming environment, while increasing the efficiency of distributed processing, through a distribution of operations.

In addition, still another object of the present invention is to rapidly access data based on a structured topology.

According to an aspect of the present invention, there is provided a method for processing data in a distributed environment, the method including: generating a virtual space using resources provided by a plurality of nodes; and reading or writing data from or in the virtual space using a first application, wherein the data are mapped to specific locations on the virtual space that are determined according to attributes of the data. The first application performs a reading operation or a writing operation for the data in one of the locations.

According to another aspect of the present invention, there is provided a system for processing data in a distributed environment, the system including: a virtual space formed using resources provided by a plurality of nodes, the virtual space comprising data stored in regions of the virtual space; and a first application to execute an operation using data from one of the regions, wherein the data is mapped to the regions according to attributes of the data.

In addition, other methods, systems, and a computer-readable recording medium for recording computer program for executing the methods are additionally provided.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description, serve to explain the principles of the invention.

DETAILED DESCRIPTION OF THE ILLUSTRATED EMBODIMENTS

Figure 1:
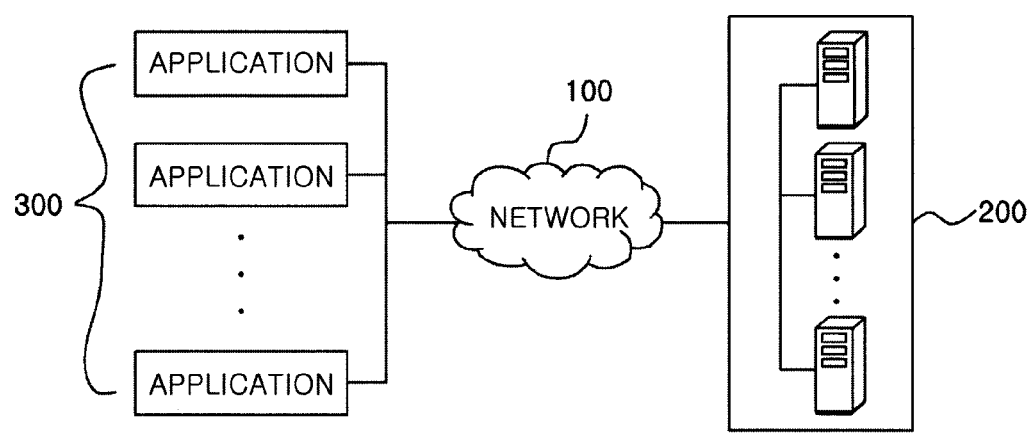
FIG. 1 is a diagram schematically showing a configuration of an overall system, according to an exemplary embodiment of the present invention.

Exemplary embodiments of the present invention will be described in detail with reference to the accompanying drawings. These exemplary embodiments will be described in detail for those skilled in the art in order to practice the present invention. It should be appreciated that various embodiments of the present invention are different but do not have to be exclusive. For example, specific shapes, configurations, and characteristics described in an exemplary embodiment of the present invention may be implemented in another exemplary embodiment without departing from the spirit and the scope of the present invention. In addition, it should be understood that position and arrangement of individual components in each disclosed exemplary embodiment may be changed without departing from the spirit and the scope of the present invention. Therefore, a detailed description described below should not be construed as being restrictive. In addition, the scope of the present invention is defined only by the accompanying claims and their equivalents if appropriate. The similar reference numerals will be used to describe the same or similar functions throughout the accompanying drawing.

Hereinafter, exemplary embodiments of the present invention will be described in detail with reference to the accompanying drawings so that those skilled in the art may easily practice the present invention.

FIG. 1 is a diagram schematically showing a configuration of an overall system, according to an exemplary embodiment of the present invention. As shown in FIG. 1, the overall system includes a communication network 100, a cluster 200 configuring a distributed programming environment, and a plurality of applications 300 performed based on the distributed programming environment.

The communication network 100 may be implemented in wired or wireless manner regardless of a communication mode. The communication network 100 may be configured as various communication networks, such as a local area network (LAN), a metropolitan area network (MAN), a wide area network (WAN), or the like.

According to an exemplary embodiment of the present invention, the cluster 200 includes computers (hereinafter, referred to as "nodes") and may provide resources, such as an arithmetic unit, a memory, or the like, so as to perform distributed programming for the application 300. That is, the cluster 200 may provide devices that enable the applications 300 to share data or program codes, provides specific data according to the requests of the applications 300, and/or returns results obtained by performing operations requested by the applications 300.

The resources provided by the cluster 200 forms a single integrated space. As such, the application 300 may be operated as if it is executed by a single computer.

Each region of the integrated space may be mapped to at least one virtual space, according to the requests of the applications 300, and may access only the specific applications 300 of the virtual space, such that communications or data sharing can be made between the applications 300, so as to perform the common operations. Thus, interference between the applications 300 may be prevented.

The applications 300 may be programs to perform the distributed program operation, using the cluster 200. The applications 300 read data from the virtual space or write data in the virtual space, such that the applications 300 can communicate with each other. Thus, the distributed programming may be performed.

Although FIG. 1 shows that the applications 300 are executed on computers that are physically separated from nodes of the cluster 200, the applications 300 may be programs executed on the nodes included in the cluster 200, according to another exemplary embodiment of the present invention. In addition, the applications 300 are collectively referred to as programs that are designed to perform predetermined operations or help perform predetermined operations. Therefore, the applications 300 may be understood to encompass programs, processes, threads, or the like.

The applications 300 store data in the virtual space allocated to the corresponding applications, or use the stored data, thereby performing the corresponding operations. In more detail, the data handled by the applications 300 may be configured as a key and value pair. In this case, the key may serve as an index for data and the value may be a data value.

The above-mentioned data are stored in the virtual space, according to a predetermined reference. Detailed aspects thereof will be described with reference to FIG. 2.

Figure 2:
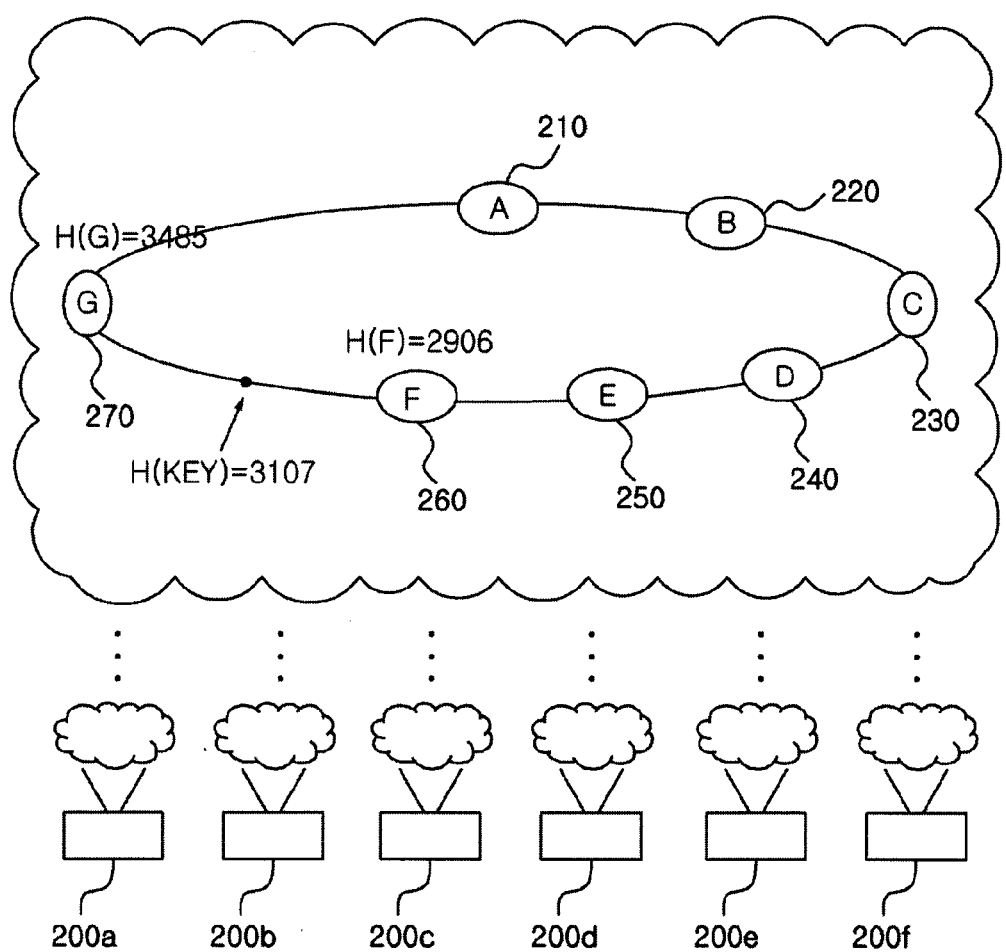
FIG. 2 is a diagram schematically showing a virtual space, according to an exemplary embodiment of the present invention.

FIG. 2 is a diagram schematically showing a virtual space, according to an exemplary embodiment of the present invention. Referring to FIG. 2, the virtual space refers to spaces provided by at least one of virtual nodes 210 to 270 that are integrated. Therefore, it can be appreciated that the virtual space is similar to a single macro memory. The virtual nodes 210 to 270 may each serve as a reference point that divides the virtual space into sections. In addition, the space provided by each virtual node 210 to 270 may be mapped to the specific resources (for example, memory) of present on nodes 200a to 200f, in which each virtual node 210 to 270 is generated. In this case, the generating the virtual node by, for example, the node 200a, refers to allocating the resources (for example, one region of the memory) of the node 200a to the corresponding virtual node.

According to the exemplary embodiment of the present invention, each virtual node (210 to 270) shown in FIG. 2 may be generated by at least one of nodes 200a to 200f. For example, both a virtual node F 260 and a virtual node G 270 may be generated by the node 200a, or the virtual node F 260 may be generated by the node 200a, and the virtual node G 270 may be generated by a node 200b.

When data is stored in the virtual space, the stored data may be mapped to (stored in) a specific region within the virtual space. In more detail, the data may be mapped within the virtual space by applying a predetermined Hash function to the key. Referring to FIG. 2, when the Hash function is applied using the key of the specific data as parameters, it can be appreciated that the data is mapped to region 3107 of the virtual space.

Each virtual node 210 to 270 may be provided with information regarding the data region of the virtual space handled by each virtual node 210 to 270 and a space ID. In the case of the virtual node F 260, "2906" is provided as the space ID, and in the case of the virtual node G 270, "3485" is provided as the space ID. The data within the virtual space may be distributed to each virtual node, by using the above-mentioned space ID. For example, the virtual node F 260 of FIG. 2 can handle the processing (for example, read, write, take, or the like) for the data mapped to (stored in) the regions of the virtual space that have space IDs of from 2906 to less than 3485, which is the space ID of the virtual node G 270.

The above space ID may be provided in various types. The space ID may be allocated manually by an operator managing the distributed programming environment. In the alternative, the space ID may be automatically determined according to a change in the number of virtual nodes that generates the virtual space or participates in the virtual space.

In more detail, the space ID allocated to the virtual node is closely associated with the region in which the data stored in the virtual space may be mapped, such that it may be determined using the same Hash function used to map the data to the virtual space. Parameters input to the Hash function for determining the space ID may include IP address information, communication port information, attribute information of virtual space, name information of virtual space, or the like, of the node generating the virtual node.

As described above, a method of storing data in the virtual space is an example of an aspect in which the actual distributed programming environment is applied, but the case in which the large-scale operation is segmented and is distributed to a plurality of applications may be considered. That is, the specific applications segment the large-scale operation into partial operations that may be distributively processed and stored in the distributed space, such that the partial operations may be subjected to the distributed processing by other applications.

According to the exemplary embodiment of the present invention, the data stored according to the above-mentioned method may be looked-up in the same manner, by the applications 300 performing the read/take operations on the corresponding data. That is, when the applications 300 look-up the data having the specific key, they may acquire the locations within the virtual space, by applying the Hash function to the corresponding key, and may acquire the data corresponding to the key from the virtual node handling the processing of the corresponding region.

According to another exemplary embodiment of the present invention, the data stored in the virtual space may be looked-up via a secured locality method. That is, the region of the virtual space that is looked-up by the applications 300 may be limited to a specific region within the virtual space. For example, a first application may be permitted to look-up only the region handled by virtual node A 210, and a second application may be permitted to look-up only the region handled by virtual node B 220 and virtual node C 230. An application 3 may be permitted to look-up only the region handled by virtual node D 240 and virtual node E 250. In this case, the characteristics of data are determined by sampling the data stored in the virtual space, such that data is uniformly distributed in the virtual space, thereby more effectively performing the distributed programming. This may be more important in a master-worker model or a scatter-gather model, used for securing locality.

According to the exemplary embodiment of the present invention, when the applications 300 using the virtual space are present on the nodes 200a to 200f participating in the virtual space, the above-mentioned method is used. As a result, the region of the virtual space that can be looked up by the application 300 may be limited to the regions handled by the virtual nodes generated by the node at which the corresponding applications 300 are present. Therefore, since the network communication is needed during only the distribution of the operations by the applications 300 allocating data, and the network communication is unnecessary during the processing of the distributed operations by the applications 300 processing the data. As such, loads applied to the network may be reduced during the distributed programming process.

When specific applications 300 can look-up at least two virtual nodes, there may be various references on which virtual node has priority. For example, the specific applications may sequentially or optionally look-up the virtual nodes, and the virtual node storing the most data is first to be looked-up.

The above-mentioned locality securing method may also be used during the process of looking-up data and the process of storing data. For example, the application 300 distributing the operations stores the data in the specific region permitted (assigned) thereto, and the application 300 processing the distributed operations may be implemented in a method of looking-up and processing the data from any virtual node.

Hereinafter, an actual example of the distributed programming code created by using the virtual space, according to an exemplary embodiment of the present invention.

1. Client-Server Model

A client-server model is a representative network programming model for a distributed environment. The client-server model, according to the exemplary embodiment of the present invention, may be easily implemented, by being allocated with a single virtual space and using a write-take function based on different keys, as an object.

Table 1 schematically shows an actual implementation code of a client-server model, according to an exemplary embodiment of the present invention.

TABLE 1

<Example of distributed program code of client-server model>

| Client | Server |
|---|---|
| Coord myspace("myspace"); | Coord myspace("myspace"); |
| pair<string,string> send_msg; | pair<string,string> send_msg; |
| send_msg.first = "myspace.server"; | send_msg.first = "myspace.client"; |
| pair<string,string> rec_msg; | pair<string,string> rec_msg; |
| rec_msg.first = "myspace.client"; | rec_msg.first = "myspace.server"; |
| send_msg.second = "this is client msg"; | myspace.take(rec_msg); |
| myspace.write(send_msg); | cout << "[server]" << |
| myspace.take(rec_msg); | rec_msg.second << endl; |
| cout << "[client]" | send_msg.second = "this is server msg"; |
| << rec_msg.second | |
| << endl; | myspace.write(send_msg); |

Referring to the program code of Table 1, network related issues (socket, thread, process, signal, pipe, or the like) are disposed in a distributed space class ("Coord" class according to the above code) and assist the transparent distributed environment, to allow a user to concentrate only his/her own development purpose, by allowing the user to use a write method, a take method, or the like, to access the distributed space. Therefore, there is no need for the user to be well-acquainted with separate network related programming for developing the client-server model.

2. Master-worker Model

A master-worker model may be usefully to assist parallel processing for maintaining a load balance in the distributed environment. Therefore, in order to perform the parallel processing in the distributed environment, the meaning of the master-worker model may be very important.

Figure 3:
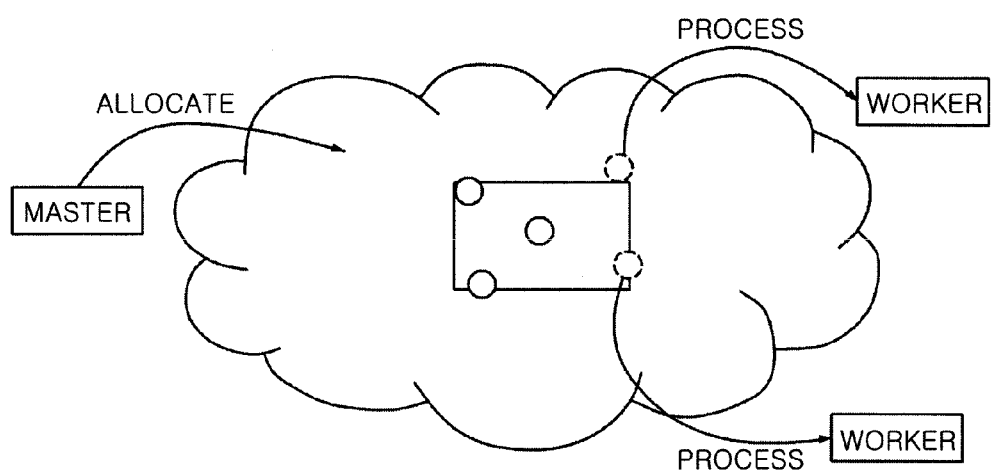
FIGS. 3 and 4 are diagrams showing two types of master-worker models, according to an exemplary embodiment of the present invention.
Figure 4:
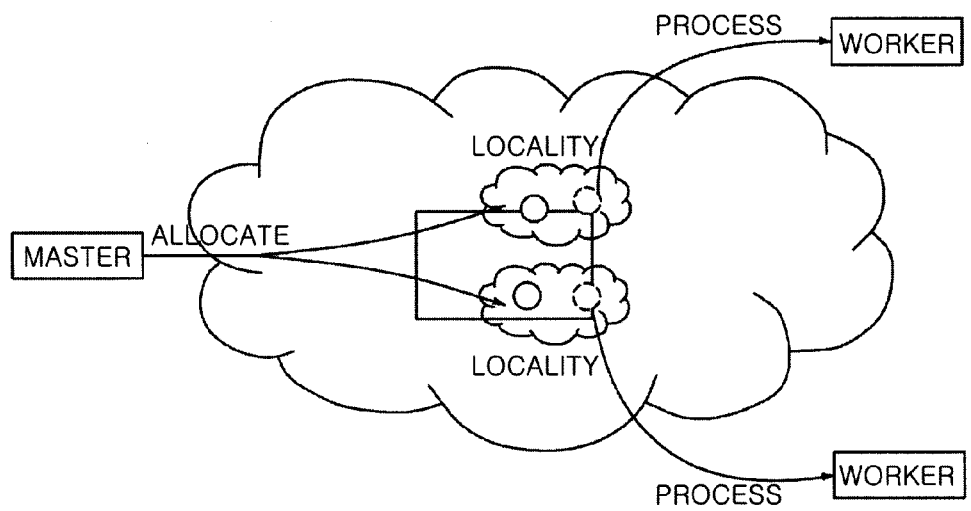

FIGS. 3 and 4 show two types of master-worker models, according to exemplary embodiments of the present invention. It can be appreciated from FIGS. 3 and 4 that the master-worker model may be executed in two methods. As shown in FIG. 3, one of the methods relates to a method of distributing operations by using the same key between the master and the workers, so as to perform the write-take operation. As shown in FIG. 4, the other is a method of allowing the master to perform the write operation using various keys. The workers (applications) to perform the take operation for only the key of the distributed space region allocated to the workers. In the former case, the workers process the work (operations) of the master, so as to be competitively allocated. In the latter case, when the master equally distributes the work, the workers process only the work allocated thereto, while securing a locality.

Table 2 schematically shows an actual implementation code of a master-worker model, according to an exemplary embodiment of the present invention.

TABLE 2

<Example of distributed program code of master-worker model>

| Master | Worker |
|---|---|
| Coord master("worker.market"); | Coord worker("worker.market"); |
| for(int i=0;i<tasks.size( );i++) { | pair<string,string> mytask; |
| pair<string,string> task; | mytask.first = "job"; |
| task.first = "job"; | worker.take(mytask); |
| task.second = tasks[i]; | perform_task(mytask); |
| master.write(task); | worker.write(mytask); |
| } | |
| for(int i=0;i<tasks.size( );i++) { | |
| pair<string,string> report; | |
| report.first = tasks[i]; | |

TABLE 2-continued

<Example of distributed program code of master-worker model>

| Master | Worker |
|---|---|
| master.take(report);<br>cout << report.second << endl;<br>} | |

Referring to the program code of Table 2,it can be appreciated that the master and the worker distribute work (operations) by using the common key "job", so as to perform the write-take work. The merit of the above-mentioned master-worker model is that there is no need for masters to recognize where workers are located and how many workers there are. Therefore, it is sufficient for the master to input only the work to be performed by the master into the distributed space, and it is sufficient for the workers to wait the allocation of work and then, perform the allocated work.

According to the exemplary embodiment of the present invention, it is possible to add a scheduler function to the master-worker model as described above. The scheduler may dynamically control the number of workers while monitoring queuing time and processing time of work. That is, when the number of operations to be processed is increased or the execution time of the operations is long, the worker may be further allocated to the available nodes or the virtual nodes, thereby improving the processing performance of the operations overall.

3. Scatter-Gather Model

A scatter-gather model is used when a large amount of data is distributively processed. The scatter-gather model, according to an exemplary embodiment of the present invention, assists an on-the-fly method that can collect and process data immediately after data is distributed, such that it may have various merits. This is a pipeline for the distributed environment and may prominently show effects in the case of effectively performing the distributed processing on a large amount of requests in real time.

According to an exemplary embodiment of the present invention, the scatter-gather model may allow a plurality of gathers to process the data input to the virtual space allocated to the gathers, when the plurality of scatters input the work to be processed into the virtual space. In this case, as already described in the master worker model, the gather may be competitively allocated with the work, by using the same keys, and may secure a locality by processing only the work allocated to their assigned virtual space region.

Table 3 schematically shows an actual implementation code of the scatter-gather model, according to an exemplary embodiment of the present invention.

TABLE 3

<Example of distributed program code of scatter-gather model>

| Scatter | Gather |
|---|---|
| Coord scatter("myspaces");<br>pair<string,string> keyval;<br>for(int i=0;i<data_size;i++) {<br>  keyval = get_kv(keyval);<br>  scatter.write(keyval);<br>} | Coord gather("myspaces");<br>for(int i=0;gather.size( )>0;i++) {<br>  pair<string,string> keyval;<br>  keyval.first = "";<br>  // get any data from local spaces<br>  gather.take(keyval);<br>  cout << keyval.first << "=" <<<br>  keyval.second << endl;<br>} |

Referring to the program code of Table 3,when the scatter inputs data to the virtual space, by generating any key using a get_kv ( ) method, the gather performs the work on the data input to the region allocated to the gather, without differentiating the key of the input data. As described above, the merits of the scatter-gather model are that, since the scatter uniformly distributes data to the virtual space, when the data is input as the key, value pair, and the gather secures the locality by processing only the data allocated to the gather, the performance thereof may be improved. In addition, since the data is distributed, collected, and processed by the on-the-fly method, the efficiency of distributed processing may be increased.

Failure Countermeasures

The distributed programming environment, according to an exemplary embodiment of the present invention, may failure countermeasures by a data replication method. This is a method of recovering data a failed node, by backing up data stored in one node (herein, a node is used as a meaning collectively referred to as a physical node and a virtual node) in another node, even when the specific node has failed.

Figure 5:
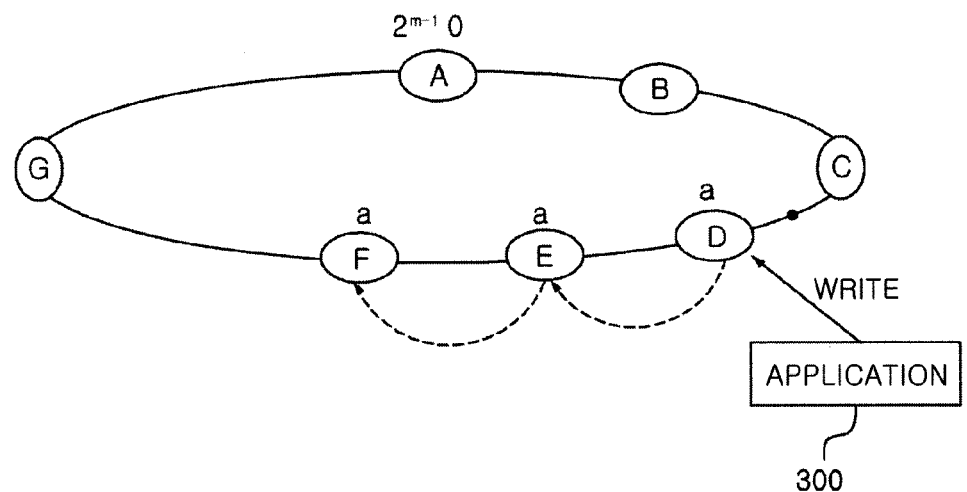
FIGS. 5 and 6 are diagrams schematically showing failure countermeasures, according to an exemplary embodiment of the present invention.
Figure 6:
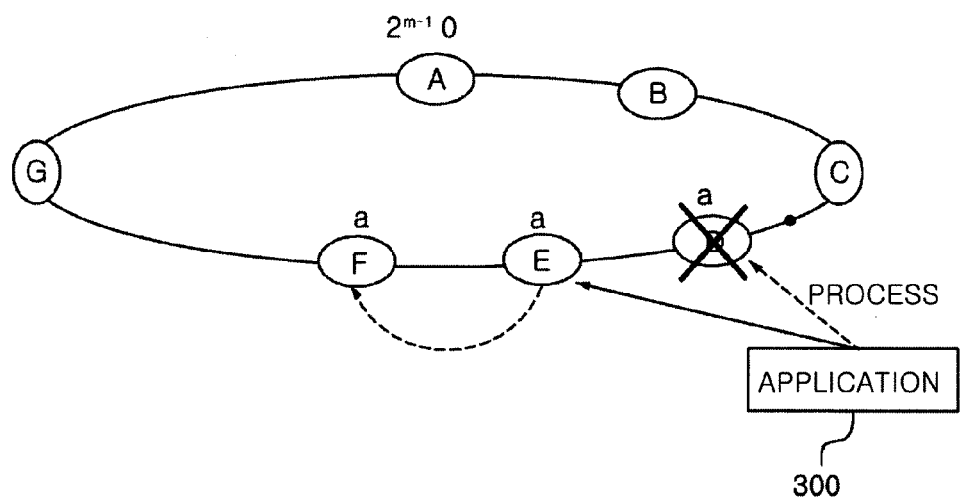

FIGS. 5 and 6 are diagrams schematically showing an aspect of performing failure countermeasures, according to an exemplary embodiment of the present invention. In FIGS. 5 and 6, it is assumed that the data present in one node is replicated in two other nodes, so as to have a total of 3 copies of the data.

Referring to FIG. 5, when data "a" input by the specific application 300 is stored while being mapped to node D, the data "a" stored in the node D may be replicated in node E and node F.

FIG. 6 shows an operation of the application 300 accessing the data "a" when the node D has failed. In more detail, the application 300 may obtain the data "a" by performing a sequential look-up for node E and node F, when a look-up for the data "a" in node D has failed. If the look-up for the data "a" from node E is successful, the look-up in node F may be omitted. The data exchange should be performed when a node is added to or removed from the virtual space, so as to hold the above-mentioned n-copy replication policy, even when the node is added to or excluded from the virtual space.

Figure 7:
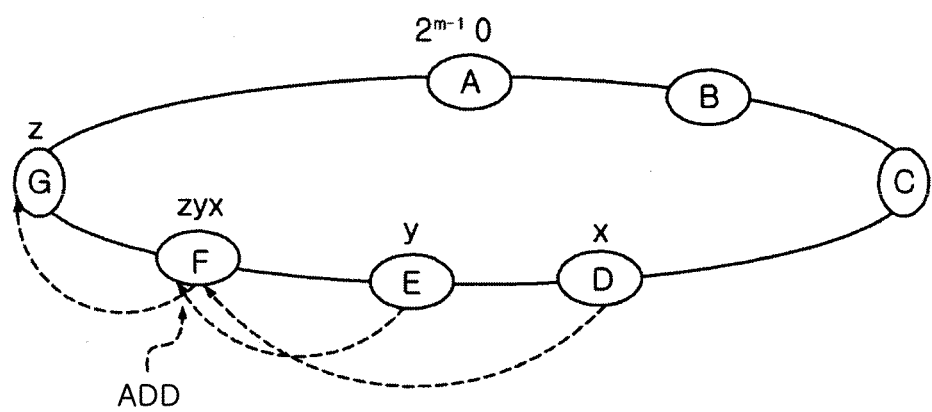
FIG. 7 is a diagram schematically showing data exchange performed when nodes are added under a 3-copy replication policy, according to exemplary embodiment of the present invention.

FIG. 7 is a diagram schematically showing data exchange performed when nodes are added under a 3-copy replication policy. In FIG. 7, it is assumed that node F is added between node E and node G, in a virtual space including nodes A, B, C, D, E, and G.

In the case shown in FIG. 7, data of node D and node E are replicated in newly added node F, and data handled by the existing node G is also replicated in node F. That is, if it is assumed that the newly added node is "spaceid" and the preceding node and the succeeding node of any node "x" each are predecessor(x) and successor(x), the following three operations may be performed.

1. Successor (space$_{id}$) transfers data handled by the space$_{id}$ to the space$_{id}$.

2. The predecessor (space$_{id}$) transfers data to be replicated by the space$_{id}$ to the space$_{id}$.

3. The predecessor (predecessor (space$_{id}$)) transfers data replicated by the space$_{id}$ to the space$_{id}$.

The above-mentioned process may be implemented similarly, even in the case in which a specific node is excluded from the virtual space.

Hereinafter, in order to help understand the aspects of the present invention, exemplary embodiments processing work using the distributed programming environment, according to an exemplary embodiment of the present invention, will be described. The distributed programming environment, according to an exemplary embodiment of the present invention, may be used for a merge sort operation for sorting large amounts of data.

Generally the merge sort operation, for large amounts of data performed under the distributed programming environment, is made by repeatedly performing a partial sort for data fragments in each node, by distributing merge sort data to "n" nodes and then, generating new data fragments by merging some of "n" data fragments, so as to meet the sort reference until all the data fragments are merged into one. In this case, as the number of times the merge is repeated is increased, the number of times the data fragments are moved between the nodes is increased, such that the load of the network is increased and the processing capability is degraded.

However, under the distributed programming environment, according to an exemplary embodiment of the present invention, the merge sort may be performed while minimizing the above problems. A detailed description of this process is as follows.

First, the data sorted by each node is stored in the distributed space, using a predetermined Hash function, by distributing the merge sort data to "n" processes. In this case, when the Hash function is appropriately set, the stored data may be mapped to the predetermined region within the distributed space, according to the sort reference. For example, when the data to be sorted is configured of a natural number of 1000 or less, and the virtual space may be 10 virtual nodes, the Hash function includes modular calculation, such that data between 1 to 100 may be mapped to a region of virtual node 1, data between 101 to 200 are mapped to a region of virtual node 2, and data between 901 to 1,000 may be mapped to a region of virtual node 10. In this case, after the data stored in the regions of each virtual node are sorted, the merge sort operation may be completed by sequentially merging the data stored in the region of virtual node 1 into the region of virtual node 10. It can be appreciated that the method can reduce the data transmission amount between the nodes, to reduce the network load, and omits the repeated merge processes, to improve the processing capability, as compared with the existing sort method.

The data may be mapped to the virtual space in a high concentration, according to the characteristics of data. For example, in the example of the merge sort, when the data to be sorted are configured of only several numbers, the data are concentrated in the specific virtual nodes, thereby degrading the efficiency of the distributed programming.

According to an exemplary embodiment of the present invention, prior to storing the data in the virtual space, the above-mentioned case can be prevented, by determining the characteristics of data using the sampling operation for the data set. By way of example, the data to be subjected to the merge sort is sampled, and the Hash function is applied to the sampled data. When the data having values between 1 to 300 occupies about 10%, it is possible to prevent data from being concentrated in some virtual nodes, by controlling the Hash function, so as to store the data between 1 and 300,in the region of virtual node 1,or increasing the region on the virtual space assigned to the virtual node 1.

Meanwhile, the distributed programming environment may be applied to a model for reusing a legacy code. In more detail, most source codes have characteristics that partially depend on a platform of the system. When the platform of the system is upgraded or changed, operation changes to the existing source code may be needed. However, under the distributed programming environment, the legacy code can be reused, by inputting and outputting the data to be processed by the legacy code through the distributed space. In more detail, even when the platform of the system is changed, the data format stored in the distributed space is maintained, such that it may be applied even under the platform in which data processing results are changed by the legacy code.

The above-mentioned exemplary embodiments of the present invention may be implemented as a program instruction type that may be performed through various computer units and may be recorded in a non-transitory computer-readable recording medium. The computer-readable recording medium may include program instructions, data files, data structure, or the like, alone or a combination thereof. The program instructions recorded in the computer-readable recording medium may be ones particularly designed and configured to meet the present invention or may be usable ones known to those skilled in the art of computer software fields. An example of the computer-readable recording medium may include a magnetic medium such as a hard disk, a floppy disk, and a magnetic tape, an optical recording medium such as CD-ROM, DVD, magento-optical media such as an optical disk, a hardware device particularly configured to store and perform program instructions such as ROM, RAM, flash memory, or the like. An example of the program instruction may include a machine language code such as ones made by a compiler and an advanced language code that may be executed by a computer using an interpreter, or the like. The hardware device may be configured to be operated as at least one software module so as to perform the processing according to the exemplary embodiments of the present invention, and vice versa.

As set forth above, an exemplary embodiment of the present invention can increase the efficiency of operations, by performing the distributed process on the large-scale calculations, using a plurality of computers. In addition, exemplary embodiments of the present invention can secure the linear scalability of the distributed programming environment. Further, exemplary embodiments of the present invention can rapidly access data in the distributed programming environment.

Hereinabove, although the present invention is described by specific matters such as concrete components, and the like, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, the following claims, and modifications thereof, are intended to fall within the scope and spirit of the invention.

What is claimed is:

1. A method for processing data in a distributed computer programming environment, the method comprising:
   generating a virtual space using resources provided by a plurality of computer nodes in a communication network, the virtual space comprising regions to which data is mapped, the computer nodes being identified in the virtual space based on at least one piece of IP address information and communication port information of the computer nodes; and
   using at least one application computer in communication with the plurality of computer nodes to execute a first application using data that is mapped to a first one of the regions of the virtual space, wherein the data is mapped to the first one of the regions according to attributes of the data by applying a Hash function to the data.

2. The method of claim 1, wherein each of the computer nodes corresponds to at least one virtual node in the virtual space.

3. The method of claim 1, wherein the data is sampled prior to being mapped by the Hash function, so as to determine the attributes of the data.

4. The method of claim 3, wherein the regions are adjusted by the sampling, such that the data is substantially evenly distributed amongst the regions by the Hash function.

5. The method of claim 1, further comprising providing the data mapped to the first region to a second application computer.

6. The method of claim 5, wherein the first application computer and the second application computer comprise a same key.

7. The method of claim 6, wherein the attributes of the data comprise the key, and the second application computer acquires the data using the key.

8. The method of claim 1, wherein the plurality of computer nodes includes the at least one application computer.

9. A non-transitory computer-readable recording medium comprising computer programs for executing the method of claim 1.

10. A computer system for processing data in a distributed computer programming environment, the system comprising:
   a plurality of computer nodes configured to generate a virtual space comprising regions to which data is mapped, the computer nodes being identified in the virtual space based on at least one piece of IP address information and communication port information of the computer nodes; and
   a first application to execute an operation using data mapped to a first one of the regions of the virtual space, wherein the data is mapped to the first one of the regions according to attributes of the data by applying a Hash function to the data.

11. The system of claim 10, wherein each of the computer nodes corresponds to at least one virtual node in the virtual space.

12. The system of claim 10, wherein at least one of the computer nodes are further configured to sample the data prior to being processed by the Hash function, in order to determine the attributes of the data.

13. The system of claim 12, wherein at least one of the computer nodes are further configured to adjust the regions by the sampling, such that the data is substantially evenly distributed amongst the regions by the Hash function.

14. The system of claim 10, further comprising a second application configured to execute an operation using the data mapped to the first region.

15. The system of claim 14, wherein the first application and the second application comprise a same key.

16. The system of claim 15, wherein the attributes of the data comprise the key, and the second application is configured to acquire the data of the first region using the key.

17. A method for processing data in a distributed computer programming environment, the method comprising:
   generating a virtual space using resources provided by a plurality of computer nodes in a communication network, the virtual space comprising regions to which data is mapped, the computer nodes being identified in the virtual space based on the computer nodes' addresses provided according to a network communications protocol; and
   using at least one application computer device in communication with the plurality of computer nodes to execute a first application using data mapped to a first one of the regions of the virtual space, wherein the data is mapped to the first one of the regions by applying a Hash function to the data.

18. The method of claim 17, wherein the plurality of computer nodes includes the at least one application computer device.

* * * * *